(12) United States Patent
Vedula et al.

(10) Patent No.: US 7,202,322 B2
(45) Date of Patent: *Apr. 10, 2007

(54) HEAT RESISTANT HIGH MOISTURE VAPOR TRANSMISSION THERMOPLASTIC POLYURETHANE

(75) Inventors: Ravi Ram Vedula, North Ridgeville, OH (US); Kimberly Lynn Young, Cleveland Heights, OH (US)

(73) Assignee: Noveon, Inc., Cleveland, OH (US)

( * ) Notice: Subject to any disclaimer, the term of this patent is extended or adjusted under 35 U.S.C. 154(b) by 265 days.

This patent is subject to a terminal disclaimer.

(21) Appl. No.: 10/694,558

(22) Filed: Oct. 27, 2003

(65) Prior Publication Data

US 2004/0092696 A1    May 13, 2004

Related U.S. Application Data

(60) Provisional application No. 60/424,884, filed on Nov. 8, 2002.

(51) Int. Cl.
- C08G 18/32 (2006.01)
- C08G 18/48 (2006.01)
- D02G 3/02 (2006.01)
- B32B 27/06 (2006.01)
- B32B 27/12 (2006.01)

(52) U.S. Cl. ............ 528/76; 57/258; 57/901; 428/98; 428/221; 428/222; 428/424.6; 528/79; 528/906

(58) Field of Classification Search ............ 57/258, 57/901; 428/98, 221, 222, 424.6; 528/76, 528/906, 79

See application file for complete search history.

(56) References Cited

U.S. PATENT DOCUMENTS

| | | | |
|---|---|---|---|
| 3,901,852 A | 8/1975 | Shah | |
| 4,202,957 A | 5/1980 | Bonk et al. | 528/77 |
| 4,532,316 A * | 7/1985 | Henn | 528/59 |
| 5,159,053 A | 10/1992 | Kolycheck et al. | 528/76 |
| 5,574,104 A | 11/1996 | Kolycheck et al. | 525/130 |
| 5,840,233 A * | 11/1998 | Foss | 264/176.1 |
| 5,863,466 A | 1/1999 | Mor | 252/500 |
| 5,937,442 A * | 8/1999 | Yamaguchi et al. | 2/69 |
| 5,959,059 A | 9/1999 | Vedula et al. | 528/76 |
| 6,022,939 A | 2/2000 | Pudleiner et al. | 528/79 |
| 6,140,405 A | 10/2000 | Eckstein et al. | 524/419 |
| 6,197,486 B1 | 3/2001 | Majumdar et al. | 430/527 |
| 6,203,901 B1 * | 3/2001 | Kosinski et al. | 428/364 |
| 6,207,361 B1 | 3/2001 | Greener et al. | 430/527 |
| 6,284,839 B1 | 9/2001 | Fahey et al. | 525/66 |

FOREIGN PATENT DOCUMENTS

| | | |
|---|---|---|
| EP | 0172610 | 2/1986 |
| EP | 1028132 | 8/2000 |
| WO | WO9856845 | 12/1998 |
| WO | WO9914252 | 3/1999 |
| WO | WO0023492 | 4/2000 |

* cited by examiner

Primary Examiner—Rabon Sergent
(74) Attorney, Agent, or Firm—Joe A. Powell

(57) ABSTRACT

A thermoplastic polyether polyurethane having high moisture vapor transmission, high melting point and static dissipative properties is disclosed. The thermoplastic polyether polyurethane is prepared by reacting a hydroxyl terminated polyether intermediate, an aromatic chain extender glycol, and a polyisocyanate. The polymers formed are useful for melt-spun fibers, fabric coatings for breathable garments, house wrap, roofing membranes, and other applications requiring high vapor transmission and high melting points.

15 Claims, No Drawings

HEAT RESISTANT HIGH MOISTURE VAPOR TRANSMISSION THERMOPLASTIC POLYURETHANE

CROSS REFERENCE

This patent application is filed pursuant to Provisional Application No. 60/424,884 filed on Nov. 8, 2002.

FIELD OF THE INVENTION

The present invention relates to heat resistant thermoplastic polyurethane (TPU) compositions which have high moisture vapor transmission rates, while being impervious to liquid water. The TPU compositions of this invention also have electrostatic dissipating properties. The TPU compositions are useful in applications requiring high moisture vapor transmission, such as house wrap, roofing underlays, various textile coatings, and melt spun fibers. This invention also relates to process to produce the TPU compositions and end use articles containing the TPU compositions.

BACKGROUND OF THE INVENTION

TPU polymers are typically made by reacting a hydroxyl terminated polyether or polyester, a chain extender and an isocyanate compound. Various types of compounds for each of the three reactants are disclosed in the literature. The TPU polymers made from these three reactants find use in various fields where products are made by melt processing the TPU and forming into various shapes by processes such as extrusion and molding. An important use of TPU is in the area of making melt spun elastic fibers, known as Spandex. The TPU fibers can be combined with other natural and synthetic fibers to make clothing and several other consumer and industrial products.

TPUs is a segmented polymer having soft segments and hard segments. This feature accounts for the excellent elastic properties of TPU. The soft segment is made up of the hydroxyl terminated intermediate, usually a polyether or polyester. The hard segments are made up of the chain extender glycol and the isocyanate.

U.S. Pat. No. 5,959,059 discloses a TPU made from a hydroxyl terminated polyether, a glycol chain extender and a diisocyanate. The TPU is useful for making fibers, golf ball cores, recreational wheels as well as other uses.

One of the deficiencies of previous known TPU fibers is their low temperature resistance. Temperature resistance is important if one wishes to make an article such as clothing by combining the TPU fibers with synthetic fibers, such as polyester fibers. These synthetic fibers must be dyed and heat set at high temperatures to prevent the clothing made from them from shrinking during washing and drying cycles. For this reason, lower temperature TPU fibers have found application in combination with natural fibers such as cotton, which do not require the high temperature heat setting treatment.

A higher temperature resistant TPU would also be desirable in fabric coating applications. One fabric coating application is in clothing where a TPU liner can be used with a fluro polymer coating which is usually heated after application to the fabric to dry and cross-link the fluro polymer. The TPU needs to withstand this heating process.

TPU polymers can also be used in applications where anti-static properties are important, such as packaging for sensitive electronic parts.

U.S. Pat. Nos. 6,140,405; 5,863,466; 6,284,839; 5,574,104; 5,159,053; 6,207,361 and 6,197,486 all disclose TPU for use in making articles with anti-static or electrostatic dissipative properties.

Another important property of the TPU for applications of this invention is its moisture vapor transmission (MVT) properties. A TPU's MVT properties is important in applications such as fabric coating, fibers, roofing membranes, house wrap and other applications. A high MVT TPU will allow moisture vapor to escape but will not allow liquid water to penetrate. This feature allows clothing to be more comfortable and to keep building structures dry.

A TPU having the properties of high temperature resistance, high MVT and anti-static properties would be highly desirable and would allow enhanced performance in products such as fibers, fabric coating, house wrap, roofing products, and clothing.

SUMMARY OF THE INVENTION

A heat resistant high moisture vapor transmission (MVT) thermoplastic polyurethane (TPU) polymer derived from reacting: (1) at least one hydroxyl terminated polyether intermediate wherein said intermediate contains an alkylene oxide having the formula

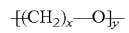

wherein x is an integer from 1 to 10 and y is an integer from 11 to 115; (2) at least one aromatic hydroxyl terminated chain extender; and at least one polyisocyanate. The alkylene oxide units in the polyether intermediate may be in the backbone or in branches or side chains.

The TPU polymer of this invention has a melting point of from about 150° C. to about 220° C., preferably from about 160° C. to about 200° C., and more preferably from about 165° C. to about 180° C. The TPU polymer of this invention has a MVT greater than about 4500 g/m² day and preferably greater than about 5500 g/m² day as measured on a 1.0 mil thick sample. Also, the TPU polymer of this invention has a surface resistivity of less than about $1.0 \times 10^{11}$ ohms/square.

It is an object of this invention to use the TPU described above to make melt spun elastic fibers, coated textiles, and other end-use articles containing the TPU.

Another object of the invention is a process to produce the TPU of this invention.

An additional object of the invention is to make melt spun fibers which can be woven with synthetic fibers, such as polyester fibers.

DETAILED DESCRIPTION OF THE PREFERRED EMBODIMENT

The TPU polymer of this invention is made from at least one hydroxyl terminated polyether intermediate, at least one aromatic chain extender glycol, and at least one polyisocyanate.

The first necessary ingredient to make the TPU is at least one hydroxyl terminated polyether intermediate. The hydroxyl terminated polyether intermediate contains an alkylene oxide having the formula

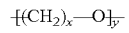

wherein x is an integer from 1 to 10, preferably 2 to 6, and y is an integer from 11 to 115, preferably 20 to 80. The most preferred embodiment is when x is 2 and y is an integer from about 28 to 38. The alkylene oxide units in the polyether intermediate may be in the backbone or in branches or side chains or may be in both the backbone and side chains. The hydroxyl terminated polyether intermediates are polyether polyols derived from a diol or polyol having a total of from 1 to 10 carbon atoms, preferably an alkyl diol or glycol which is reacted with an ether comprising an alkylene oxide having 2 to 6 carbon atoms, typically ethylene oxide or tetrahydrofuran or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly (ethylene glycol) comprising ethylene oxide reacted with ethylene glycol, poly (propylene glycol) comprising propylene oxide reacted with propylene glycol. Copolyethers can also be utilized in the current invention. The copolyethers may be block copolymers or random copolymers. Poly (ethylene glycol) is the preferred polyether intermediate. The various polyether intermediates generally have a number average molecular weight (Mn), as determined by assay of the terminal functional groups which is an average molecular weight, of from about 350 to about 10,000, desirably from about 500 to about 5,000, and preferably from about 700 to about 3,000, and most preferred from about 1,000 to about 2,000. A blend of two or more hydroxyl terminated polyether intermediates may be used to make the TPU of this invention.

The second necessary ingredient to make the TPU of this invention is an aromatic chain extender glycol. Benzene glycol and xylenene glycols are suitable chain extenders for use in making the TPU of this invention. Xylenene glycol is a mixture of 1,4-di(hydroxymethyl) benzene and 1,2-di (hydroxymethyl) benzene. Benzene glycol is the preferred chain extender and specifically includes hydroquinone, i.e., bis(beta-hydroxyethyl) ether also known as 1,4-di(2-hydroxyethoxy) benzene; resorcinol, i.e., bis(beta-hydroxyethyl) ether also known as 1,3-di(2-hydroxyethyl) benzene; catechol, i.e., bis(beta-hydroxyethyl) ether also known as 1,2-di(2-hydroxyethoxy) benzene; and combinations thereof. A blend of two or more aromatic glycol chain extenders may be used.

The amount of the aromatic glycol chain extender used in making the TPU is generally from about 1.0 to about 2.0, preferably from about 1.2 to about 1.8 moles per mole of the hydroxyl terminated polyether intermediate.

The third necessary ingredient to make the TPU of this invention is at least one polyisocyanate. Preferably, the polyisocyanate is a diisocyanate. While aliphatic diisocyanates can be utilized, aromatic diisocyanates are highly preferred. Moreover, the use of multifunctional isocyanate compounds, i.e., triisocyanates, etc., which cause crosslinking, are generally avoided and thus the amount used, if any, is generally less than 4 mole percent and preferably less than 2 mole percent based upon the total moles of all of the various isocyanates used. Suitable diisocyanates include aromatic diisocyanates such as: 4,4'-methylene bis-(phenyl isocyanate) (MDI); m-xylene diisocyanate (XDI), phenylene-1-4-diisocyanate, naphthalene-1,5-diisocyanate, diphenylmethane-3,3'-dimethoxy-4,4'-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. Dimers and trimers of the above diisocyanates may also be used as well as a blend of two or more diisocyanates may be used.

The polyisocyanate used in this invention may be in the form of a low molecular weight polymer or oligomer which is end capped with an isocyanate. For example, the hydroxyl terminated polyether intermediate described above may be reacted with an isocyanate-containing compound to create a low molecular weight polymer end capped with isocyanate. In the TPU art, such materials are normally referred to as prepolymers. Such pre-polymers normally have a number average molecular weight (Mn) of from about 500 to about 10,000.

The mole ratio of the one or more diisocyanates is generally from about 0.95 to about 1.05, and preferably from about 0.98 to about 1.03 moles per mole of the total moles of the one or more hydroxyl terminated polyether intermediates and the one or more aromatic chain extenders.

The TPU polymers of this invention are made up of hard segments and soft segments. The soft segment contains the hydroxyl terminated polyether and the hard segment contains the aromatic glycol and the isocyanate. It is important that the soft segment have limited solubility in the hard segment, such that when the TPU is formed, the soft segment is higher concentrated on the surface of the TPU. Since the soft segment is responsible for the TPU's ability to transmit moisture vapor, a higher concentration of soft segment on the surface will give higher MVT.

It is also important that the TPU contains an aromatic glycol chain extender as opposed to a conventional straight chain glycol, such as 1,4-butanediol. The aromatic glycol chain extender results in a higher temperature TPU and makes the soft segment less soluble in the hard segment thus increasing MVT.

The process to produce the TPU polymer of this invention can utilize conventional TPU manufacturing equipment. The hydroxyl terminated polyether intermediate, the diisocyanate, and the aromatic chain extender, as noted above, are generally added together and reacted in accordance with any conventional urethane reaction method. Preferably, the TPU forming components of the present invention are melt polymerized in a suitable mixer, such as an internal mixer known as a Banbury mixer, or preferably an extruder. In the preferred process, the hydroxyl terminated polyether intermediate is blended with the aromatic glycol chain extender and added to the extruder as a blend. The diisocyanate is added separately to the extruder. Suitable processing or polymerization starting temperatures of the diisocyanate is from about 100° C. to about 200° C., and preferably from about 100° C. to about 150° C. Suitable processing or polymerization starting temperatures of the blend of the hydroxyl terminated polyether intermediate and the aromatic chain extender is from about 100° C. to about 220° C., and preferably from about 150° C. to 200° C. Suitable mixing times in order to enable the various components to react and form the TPU polymers of the present invention are generally from about 2 to about 10 minutes, and preferably from about 3 to about 5 minutes.

The preferred process to produce the TPU of this invention is the process referred to as the one-shot polymerization process. In the one-shot polymerization process which generally occurs in situ, a simultaneous reaction occurs between three components, that is the one or more hydroxyl terminated polyether intermediates, the aromatic glycol, and the diisocyanate. The reaction is generally initiated at temperature of from about 100° C. to about 120° C. Inasmuch as the reaction is exothermic, the reaction temperature generally increases to about 220° C.–250° C. The TPU polymer will exit the reaction extruder and be pelletized. The pellets of TPU are normally stored in a heated vessel to continue the reaction and to dry the TPU pellets.

It is often desirable to utilize catalysts such as stannous and other metal carboxylates as well as tertiary amines. Examples of metal carboxylates catalysts include stannous octoate, dibutyl tin dilaurate, phenyl mercuric propionate, lead octoate, iron acetylacetonate, magnesium acetylacetonate, and the like. Examples of tertiary amine catalysts include triethylene diamine, and the like. The amount of the one or more catalysts is low, generally from about 50 to about 100 parts by weight per million parts by weight of the end TPU polymer formed.

The weight average molecular weight (Mw) of the TPU polymer of the present invention range from about 100,000 to about 500,000 Daltons, preferably from about 150,000 to about 400,000 Daltons, and more preferably from about 175,000 to about 300,000 Daltons. The Mw of the TPU polymer is measured according to gel permeation chromatography (GPC) against polystyrene standard.

The TPU polymers of the present invention can be mixed with various conventional additives or compounding agents, such as fillers, extenders, pigments, plasticizers, lubricants, UV absorbers, and the like. Fillers include talc, silicates, clays, calcium carbonate, and the like. The level of conventional additives will depend on the final properties and cost of the desired end-use application, as is well known to those skilled in the art of compounding TPUs. The additives may be added during the reaction to form the TPU, but are normally added in a second compounding step.

The TPU polymer of this invention has a high melting point, as measured according to ASTM D-3417-99 using a differential scanning calorimeter (DSC), of from about 150° C. to about 220° C., preferably from about 160° C. to about 200° C., and more preferably from about 165° C. to about 180° C. The high melting point is important in applications using melt spun fibers with other synthetic fibers, such as polyester. Certain melt coating applications also require high melting point TPU to withstand the manufacturing process, especially those applications which require the use of fluro polymers.

The TPU polymer of this invention also has a high moisture vapor transmission (MVT) rate. This feature is important in applications where it is important to transfer moisture through the TPU but also have the TPU be a barrier to liquid water. The MVT of the TPU polymer of this invention is greater than about 4500 g/m$^2$ day and preferably greater than about 5500 g/m$^2$ day as measured on a 1.0 mil thick sample. The high MVT results in fabric coated with the TPU being more comfortable. Also, melt spun fibers made from the TPU and combined with other fibers in clothing will be more comfortable for the wearer of such clothing. High MVT is also desirable in applications such as roofing membranes and house wrap, where moisture needs to be transferred away from the building structure to the atmosphere.

MVT values are determined using a Permatran-W Model 100K instrument by Mocan. Test samples used are flat film samples 1 mil thick that have been produced on a one inch extruder. The test film is conditioned for 24 hours at 50% relative humidity. The film samples are cut into 2 inch by 2 inch squares. After the samples are placed in test cells in the Permatran-W Model 100K, the global test parameters are entered into the Mocan computer system. The computer starts the conditioning period, and the test automatically commences after the period is completed. Statistical test information is charted during the testing, and a printed report of the test data can be obtained at any time. The computer automatically determines when the testing is complete.

A TPU with high MVT creates a breathable fabric, which allows moisture vapor to escape while providing a barrier to liquid water. Prior art breathable fabrics having a thermoplastic layer normally have small pores or holes in the plastic film to let moisture escape. The TPU layer in breathable fabrics of this invention do not have holes or pores, they are solid which results in a more perfect barrier to liquid water penetration while offering the comfort of allowing moisture to escape by the MVT properties.

Breathable fabric will normally have at least one layer of fabric, which can be either non-woven fabric or woven fabric. The fibers used for the fabric layer can be any of the known natural or synthetic fibers. Examples of natural fibers are cotton and wool. Examples of synthetic fibers are nylon, polyester, rayon and armid fibers. The breathable fabric also has one or more layers of the TPU polymer of this invention. The TPU polymer is applied to the fabric by a melt coating process which involves extruding or calendering a thin sheet of the TPU and applying the hot sheet to the fabric. The TPU sheet can also be extruded or calendered, wound up in rolls and later laminated to the fabric. The processes of melt coating and lamination are well known in the art. Adhesive layers are often used to gain adhesion of the various layers in breathable fabrics. The breathable fabric can also have a fluro polymer layer which is usually applied and must be heated to dry and crosslink.

Breathable fabrics can be made into various garments and are particularly desirable in garments such as sporting cloths, coats, and protective garments worn by safety forces and people working in industrial factories. The entire garment may be made from breathable fabric or the breathable fabric may be only used in portions of the garments.

When making melt spun fibers from the TPU of this invention, it is preferred to use an additive to slightly crosslink the TPU. The preferred additive is diphenyl methane diisocyanate terminated polyether prepolymer or diphenylmethane diisocyanate-terminated polyester prepolymer. These materials are polyether or polyester glycols where the hydroxyl groups are converted to isocyanate groups to provide isocyanate termination. The crosslinking additives are available from Hyperlast Limited, U.K. as Hyperlast® 5130 for the polyether prepolymer and as Diprane® 5128 and Diprane® 5184 for the polyester prepolymer. The preferred additive is Hyperlast® 5130, which is a diphenyl methane diisocyanate-terminated polyether prepolymer derived from poly(tetramethylene ether) glycol having a number average molecular weight of about 2000 and MDI. The amount of crosslinking additive used in making the preferred melt spun fibers is from about 5 wt. % to about 20 wt. %, and preferably from about 10 wt. % to about 15 wt. % of the fiber. Melt spun fibers can be made from the TPU polymer of this invention without the use of a cross linking additive. However, it has been found that the crosslinking additive will enhance the fiber performance.

The fiber is made by melt spinning the TPU mixed with the crosslinking additive. Melt spinning is a well known process in which a polymer is melted by extrusion, passed through a spinning nozzle into air, solidified by cooling, and collected by winding the fibers on a collection device. Typically the fibers are preferred melt spun at a polymer temperature of about 150° C. to about 300° C.

The melt spun fibers made from the TPU of this invention can be combined or woven with other fibers and used in clothing apparel. Prior art melt spun TPU fibers are normally combined with cotton fibers but not with polyester fibers.

The TPU of this invention can also be combined with cotton but unlike the prior art TPU, it can also be combined with polyester due to the high melting point of the TPU.

The TPU of this invention also exhibits static dissipative properties. The TPU has a surface resistivity of less than $1.0 \times 10^{11}$ ohms/square, as measured according to ASTM D-257. Preferably, the surface resistivity is less than $3.0 \times 10^{10}$ ohms/square. Static dissipative properties are important in several applications for the TPU of this invention. Melt spun fibers having static dissipative properties process better in that less static charge is exhibited in the weaving process and the fibers in their final application will attract less dust particles. This feature allows clothing to remain cleaner.

The invention will be better understood by reference to the following examples which serve to illustrate, but not to limit the scope of the present invention.

EXAMPLES

The TPU made in Examples 1, 2, and 3, as well as Comparative Examples 1 and 2, where made by the same procedure. The procedure used involved heating the blend of polyether intermediate and chain extender and diisocyanate separately to about 150° C. and then mixing the ingredients. The reaction was exothermic and the temperature increased to about 200° C. to 250° C. in about 1 to 5 minutes, during which time polymerization takes place as evidenced by an increase in viscosity. The physical properties of the TPU formed was measured and are shown in Tables 1 and 2. Table 1 shows the MVT values and the surface resistivity while Table 2 shows glass transition temperature, melting point, hardness, modulus, ultimate tensile, and flex modulus.

Example 4 shows melt spun fiber made from the TPU produced by Example 2. Table 3 shows the fiber processing conditions.

Example 1

0.17 moles (241.61 grams) of polyethylene glycol (PEG) with a molecular weight of 1450 was blended at 90° C. with 0.29 moles (58.39 grams) of hydroquinone bis (2-hydroxyethyl) ether (HQEE) chain extender. This blend or physical mixture was then reacted with 0.460 moles (115 grams) of methylene bis diphenyl diisocyanate (MDI) by a standard high temperature random melt polymerization procedure as described above to give the TPU polymer designated as Example 1.

Example 2

0.173 moles (250.67 grams) of polyethylene glycol (PEG) with a molecular weight of 1450 was blended at 90° C. with 0.257 moles (50.83 grams) of hydroquinone bis (2-hydroxyethyl) ether (HQEE) chain extender. This blend or physical mixture was then reacted with 0.427 moles (106.78 grams) of methylene bis diphenyl diisocyanate (MDI) by a standard high temperature random melt polymerization procedure as described above to give the TPU polymer designated as Example 2.

Example 3

0.176 moles (255.72 grams) of polyethylene glycol (PEG) with a molecular weight of 1450 was blended at 90° C. with 0.224 moles (44.28 grams) of hydroquinone bis (2-hydroxyethyl) ether (HQEE) chain extender. This blend or physical mixture was then reacted with 0.399 moles (99.65 grams) of methylene bis diphenyl diisocyanate (MDI) by a standard high temperature random melt polymerization procedure as described above to give the TPU polymer designated as Example 3.

Comparative Example 1

0.178 moles (257.95 grams) of polyethylene glycol (PEG) with a molecular weight of 1450 was blended at 60° C. with 0.467 moles (42.05 grams) of 1,4-butanediol (BDO) chain extender. This blend or physical mixture was then reacted with 0.666 moles (166.41 grams) of methylene bis diphenyl diisocyanate (MDI) by a standard high temperature random melt polymerization procedure as described above to give the TPU polymer designated as Comparative Example 1.

Comparative Example 2

0.246 moles (245.62 grams) of polyethylene glycol (PEG) with a molecular weight of 1000 was blended at 60° C. with 0.604 moles (54.38 grams) of 1,4-butanediol (BDO) chain extender. This blend or physical mixture was then reacted with 0.850 moles (212.46 grams) of methylene bis diphenyl diisocyanate (MDI) by a standard high temperature random melt polymerization procedure as described above to give the TPU polymer designated as Comparative Example 2.

Example 4

Pellets from the TPU polymer produced in Example 2 were dried for 6 hours at 80° C. to reduce the moisture content to below 0.03% by weight. Fibers were extruded through a single screw extruder to a spinneret with an orfice diameter of 0.5 mm. The fibers were wound at a speed of 200 meters per minute. The conditions used to spin the antistatic/breathable fibers are shown in Table 3.

TABLE 1

|  | MVT (g/m² day) | Surface Resistivity (ohms/square) |
|---|---|---|
| Test Method | Permatran W Model 100K by Mocon | ASTM D-257 |
| Example 1 | 5892 | $2.5 \times 10^{10}$ |
| Example 2 | 6679 | $2.3 \times 10^{10}$ |
| Example 3 | 11330 | $1.6 \times 10^{10}$ |
| Comparative Example 1 | 4459 | $1.7 \times 10^{10}$ |
| Comparative Example 2 | 2128 | $7.9 \times 10^{10}$ |

TABLE 2

|  | Text Method | Example 1 | Example 2 | Example 3 | Comparative Example 1 | Comparative Example 2 |
|---|---|---|---|---|---|---|
| Glass Transition Temperature (° C.) | ASTM D-3417-99 | −30 | −26 |  | −34 | −8.5 |

TABLE 2-continued

| | Text Method | Example 1 | Example 2 | Example 3 | Comparative Example 1 | Comparative Example 2 |
|---|---|---|---|---|---|---|
| Melting Point (° C.) | ASTM D-3417-99 | 177 | 170 | | 154 | 160 |
| Hardness (Shore A) | ASTM D-2240 | 86A | 83A | 79A | 80A | 86A |
| Modulus (psi) | | | | | | |
| @50% Elongation | ASTMD-412/D-638 | 864 | 741 | 580 | 607 | |
| @100% Elongation | | 1010 | 900 | 706 | 731 | 990 |
| @200% Elongation | | 1240 | 1160 | 855 | 942 | |
| @300% Elongation | | 1580 | 1520 | 1020 | 1370 | 1840 |
| @400% Elongation | | 1950 | 1960 | 1230 | 2170 | |
| @500% Elongation | | 2280 | 2370 | 1420 | 3430 | |
| Ultimate Elongation (%) | ASTM D-412/D-638 | 714 | 760 | 963 | 631 | 590 |
| Ultimate Tensile Strength (psi) | ASTM D-412/D-638 | 2910 | 4120 | 2130 | 5990 | 5100 |
| Flex Modulus (psi) | ASTM D-790 | 5510 | 4320 | 3200 | 2530 | |

TABLE 3

Fiber Processing Conditions

| | | Example 2 |
|---|---|---|
| Drying | Time (h) | 6 |
| | Temperature (° C.) | 80 |
| Extruder | Zone 1 (° C.) | 180 |
| | Zone 2 (° C.) | 190 |
| | Zone 3 (° C.) | 195 |
| | Zone 4 (° C.) | 197 |
| | Back Pressure (psi) | 1000 |
| | Spinneret (° C.) | 197 |
| Winding Conditions | Speed (m/min) | 200 |

The melt spun fibers showed excellent properties of high elongation, good processing, breathability, and high temperature resistance.

From the data in Table 1, it can be seen that the MVT of the TPU of this invention using the aromatic chain extender (HQEE) is much greater (a factor of 2–3) than the TPU made in the comparative example using aliphatic chain extender (BDO). Normally, it is the polyether intermediate (PEG) that controls the MVT as the PEG has oxygen groups which bind with the water vapor and transfer the water vapor through the TPU. It was very unexpected that the TPU having the same polyether intermediate (PEG) in the examples would exhibit such a dramatic improvement in MVT with the use of an aromatic chain extender (HQEE). It is believed that this result occurs because the PEG is less soluble in HQEE than it is in BDO, and therefore, the PEG is more highly concentrated on the surface of the TPU. A higher surface concentration of PEG on the surface would explain its ability to bind with and transfer more water vapor. The data of Table 1 also shows the TPU of this invention to have a low surface resistivity, thus giving it static dissipative properties.

The data in Table 2 shows that the TPU of this invention has a melting point that is 10–20° C. higher than the comparative examples. This increase in melting point is significant in that it allows the TPU melt-spun fibers to be woven with synthetic fibers such as polyester that require higher temperatures in the garment manufacturing process. The higher melting point also allows fabric to be coated with the TPU where the fabric also has a fluro polymer coating that is subjected to higher temperature to dry and crosslink the fluro polymer. This is particularly important for breathable garments such as sporting clothing and winter coats. The high MVT also results in such garments being more comfortable for the wearer.

While in accordance with the Patent Statutes, the best mode and preferred embodiment has been set forth, the scope of the invention is not limited thereto, but rather by the scope of the attached claims.

What is claimed is:

1. A breathable article comprising: (a) at least one layer of fabric and (b) at least one layer of thermoplastic polyurethane polymer, wherein said polyurethane polymer is a polyether polyurethane derived from at least one diisocyanate reacted in a one-shot process with at least one hydroxyl terminated aromatic glycol chain extender selected from the group consisting of 1,4-di(hydroxymethyl) benzene, 1,2-di(hydroxymethyl) benzene, 1,4-di(2-hydroxyethoxy) benzene, 1,3-di(2-hydroxyethyl) benzene, 1,2-di(2-hydroxyethoxy) benzene, and combinations thereof, and at least one hydroxyl terminated polyether polyethylene glycol intermediate containing an alkylene oxide having the formula

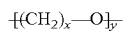

wherein x is 2 and y is an integer from 11 to 115 wherein the amount of aromatic glycol chain extender used is from about 1.2 to about 1.8 moles per mole of hydroxyl terminated polyether intermediate and the mole ratio of the at least one diisocyanate used is from about 0.95 to about 1.05 moles of diisocyanate per mole of the total moles of the one or more hydroxyl terminated polyether intermediate and the one or more hydroxyl terminated aromatic glycol chain extender.

2. An article of claim 1 wherein said at least one layer of fabric comprises a non-woven fabric.

3. An article of claim 1 wherein said at least one layer of fabric comprises a woven fabric.

4. An article of claim 1 wherein said article comprises at least one layer of fluro polymer in addition to said at least one layer of fabric and at least one layer of thermoplastic polyurethane polymer.

5. An article of claim 4 wherein said article is an article of clothing.

6. An article of claim 1 wherein said article is house wrap.

7. An article of claim 1 wherein said article is an article of roofing membrane.

8. An article of claim 1 wherein said hydroxyl terminated polyethylene glycol has a number average molecular weight of from about 1,000 to about 2,000, said diisocyanate is 4,4'methylene bis-(phenyl isocyanate), said aromatic glycol chain extender is 1,4-di(2-hydroxyethoxy) benzene, and wherein said polyurethane polymer has a moisture vapor transmission rate of greater than about 5500 g/m² day as measured on a 1.0 mil thick sample and a melting point of from about 165° C. to about 180° C. as measured according to ASTM D-3417-99.

9. A melt spun fiber comprising a thermoplastic polyurethane polymer, wherein said polyurethane polymer is a polyether polyurethane derived from at least one diisocyanate reacted in a one-shot process with at least one hydroxyl terminated aromatic glycol chain extender selected from the group consisting of 1,4-di(hydroxymethyl) benzene, 1,2-di(hydroxymethyl) benzene, 1,4-di(2-hydroxyethoxy) benzene, 1,3-di(2-hydroxyethyl) benzene, 1,2-di(2-hydroxyethoxy) benzene, and combinations thereof, and at least one hydroxyl terminated polyether polyethylene glycol intermediate containing an alkylene oxide having the formula

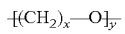

wherein x is 2 and y is an integer from 11 to 115 wherein the amount of aromatic glycol chain extender used is from about 1.2 to about 1.8 moles per mole of hydroxyl terminated polyether intermediate and the mole ratio of the at least one diisocyanate used is from about 0.95 to about 1.05 moles of diisocyanate per mole of the total moles of the one or more hydroxyl terminated polyether intermediate and the one or more hydroxyl terminated aromatic glycol chain extender.

10. A melt spun fiber of claim 9 comprising an additive to cross link said polyurethane polymer.

11. A melt spun fiber of claim 10 wherein said additive to cross link said polyurethane polymer is a 4,4'-methylene bis-(phenyl isocyanate) terminated polyether prepolymer, wherein said prepolymer is derived from poly(tetramethylene ether) glycol reacted with 4,4'-methylene bis-(phenyl isocyanate).

12. A melt spun fiber of claim 11 wherein the level of said additive used is from about 5 weight percent to about 20 weight percent of the said fiber.

13. A clothing garment comprising melt spun fibers, said fibers are thermoplastic polyurethane polymer fibers derived from at least one diisocyanate reacted with in a one-shot process at least one hydroxyl terminated aromatic glycol chain extender selected from the group consisting of 1,4-di(hydroxymethyl) benzene, 1,2-di(hydroxymethyl) benzene, 1,4-di(2-hydroxyethoxy) benzene, 1,3-di(2-hydroxyethyl) benzene, 1,2-di(2-hydroxyethoxy) benzene, and combinations thereof and at least one hydroxyl terminated polyether polyethylene glycol intermediate containing an alkylene oxide having the formula

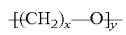

wherein x is 2 and y is an integer from 11 to 115 wherein the amount of aromatic glycol chain extender used is from about 1.2 to about 1.8 moles per mole of hydroxyl terminated polyether intermediate and the mole ratio of the at least one diisocyanate used is from about 0.95 to about 1.05 moles of diisocyanate per mole of the total moles of the one or more hydroxyl terminated polyether intermediate and the one or more hydroxyl terminated aromatic glycol chain extender.

14. A clothing garment of claim 13 comprising polyester fibers woven together with said melt spun thermoplastic polyurethane polymer fibers.

15. A clothing garment of claim 14 wherein said hydroxyl terminated polyether intermediate is polyethylene glycol, said diisocyanate is 4,4'-methylene bis-(phenyl isocyanate), said aromatic glycol chain extender is 1,4-di(2-hydroxyethoxy) benzene, and wherein said polyurethane polymer has a moisture vapor transmission rate of greater than about 5500 g/m² day as measured on a 1.0 mil thick sample and a melting point of from about 165° C. to about 180° C. as measured according to ASTM D-3417-99.

* * * * *